United States Patent

[11] 3,627,825

| [72] | Inventor | Darwin D. Davis |
| --- | --- | --- |
| | | Victoria, Tex. |
| [21] | Appl. No. | 829,136 |
| [22] | Filed | Mar. 29, 1969 |
| [45] | Patented | Dec. 14, 1971 |
| [73] | Assignee | E. I. du Pont de Nemours and Company |
| | | Wilmington, Del. |

[54] PURIFICATION OF 1,12-DODECANEDIOIC ACID USING PERCHLOROETHYLENE
3 Claims, No Drawings

[52] U.S. Cl. .................................................. 260/537 R,
260/531 R, 260/537 P
[51] Int. Cl. ........................................................ C07c 51/48
[50] Field of Search ............................................. 260/537,
537 O

[56] References Cited

UNITED STATES PATENTS

| 3,366,680 | 1/1968 | Minisci ......................... | 260/537 |
| 3,383,413 | 5/1968 | Jaffe ............................. | 260/537 |

*Primary Examiner*—Lorraine A. Weinberger
*Assistant Examiner*—Vivian Garzer
*Attorney*—Robert C. Kline

ABSTRACT: A process for the purification of 1,12-dodecanedioic acid by contacting molten 1,12-dodecanedioic acid with an organic solvent having the formula $C_nX_mH_{2n+2-m}$ or $C_pX_mH_{2p-m}$ wherein $X$ is a halogen, $n$ is an integer of from 1 to 3, $p$ is 2 or 3, and $m$ is an integer from 3 to $2n+2$ or $2p$. After contacting the 1,12-dodecanedioic acid is crystallized by lowering the temperature followed by removal of the acid crystals from the halogenated hydrocarbon solvent and dissolved impurities by filtration.

PURIFICATION OF 1,12-DODECANEDIOIC ACID USING PERCHLOROETHYLENE

BACKGROUND OF THE INVENTION

Monobasic acids are well-known undesirable impurities in polyamide intermediates. The nitric acid oxidation of mixtures of cyclododecanol and cyclododecanone to 1,12-dodecanedioic acid produces a significant quantity of these materials from various precursors in the alcohol/ketone feed. Removal of these impurities by the techniques used to purify other dibasic organic acids such as adipic acid are unsatisfactory in the present situation due to their higher molecular weight and consequent lower solubility and volatility. Dibasic organic acids by extraction of the monobasic acid with a polar or aqueous solvent and a nonpolar solvent to form two immiscible phases which are separated physically followed by flashing off the nonpolar solvent from the dibasic acid phase. Such a process is described in U.S. Pat. No. 2,852,558 issued Sept. 16, 1958 to Julian Feldman.

SUMMARY OF THE INVENTION

The present invention generally involves treating impure 1,12-dodecanedioic acid with an organic solvent of the formula $C_nX_mH_{2n+2-m}$ or $C_pX_mH_{2p-m}$ wherein $n$ is an integer of from 1-3, $p$ is 2 or 3, $m$ is an integer of from 2 to $2n+2$ and $X$ is halogen. Chlorine is the preferred halogen to be used as $X$ in the formula. The preferred solvents are chloroform, carbon tetrachloride, trichloroethylene, and tetrachloroethylene. In a preferred aspect of the invention the mixture is heated to melt the 1,12-dodecanedioic acid and form a system from which 1,12-dodecanedioic acid can be crystallized leaving the saturated halogenated hydrocarbon solvent and the impurities which are principally monobasic acids containing from eight to 17 carbon atoms.

Generally, the weight ratio of halogenated solvent phase to 1,12-dodecanedioic acid phase should vary from 1:1 to 50:1.

The pressure used is not critical and ordinarily is 1 atmosphere. However, when using the lower-boiling solvents which boil in the range of 60° C. to 100° C. a pressure of up to about 5.0 atmospheres can be used to advantage. Reduced pressures of as low as 0.2 atmosphere may be used with the higher boiling solvents such as tetrachloropropane.

The temperature may be varied over a wide range. Generally, temperatures below about 60° C. are not preferred since there is a rapid decrease in the amount of the impurities removed at lower temperatures. Preferably, the 1,12-dodecanedioic acid should be molten or dissolved which occurs at about 95° C. in most of the preferred solvents. The upper limit is not critical once the liquid state of the 1,12-dodecanedioic acid has been reached and temperature as high as 140° C. may be used. However, as a practical matter, there is little advantage to be gained in using a temperature above 130° C., about the melting point of the pure 1,12-dodecanedioic acid.

The treatment with the solvent is preferably carried out for from 5 to 60 minutes although times of from 1 minute to 4 hours can be used if desired. Preferably the mixture is agitated.

After treatment with the solvent, the 1,12-dodecanedioic acid is recovered by lowering the temperature of the two-phase system to crystallize the 1,12-dodecanedioic acid followed by filtering off the purified 1,12-dodecanedioic acid crystals by means of a conventional filter. Generally, the system should be cooled to below 85° C. to ensure fairly complete crystallization of the 1,12-dodecanedioic acid so as to prevent too high a yield loss. There is little advantage in yield loss to be gained by cooling to below 50° C.

Generally, the 1,12-dodecanedioic acid is recovered in greater than an 80 percent yield with the impurity content reduced to from 1/10 to 1/50 that of the starting material.

DESCRIPTION OF THE PREFERRED EMBODIMENTS

EXAMPLE I

A mixture of 20 g. of wet 1,12-dodecanedioic acid (23 $H_2O$) and 100 cc. of perchloroethylene is heated at boiling, which removes the water. When the temperature reaches 105° C., the 1,12-dodecanedioic acid has all melted. Two liquid phases are now present. The mixture is heated at this temperature for 5 minutes then cooled to 25° C. and filtered with a laboratory-fitted glass filter to collect the crystals. The excess perchloroethylene is removed by rinsing on the filter with a small amount of acetone, then the cake is air-dried. An 81 percent recovery of white crystals is obtained.

|  | 1,12-dodecanedioic acid | n—$C_8$—$C_{17}$ Monobasic Acids |
|---|---|---|
| Feed | 99.6% | 0.17% |
| Product | 99.98% | 0.011% |

EXAMPLE II (9452-155)

In a manner similar to that in example I, 59 g. of dry crude 1,12-dodecanedioic acid is heated with 400 cc. of perchloroethylene at reflux (120° C.) for 10 minutes, where complete solution is effected. The mixture is then cooled to 85° C. and filtered. The excess perchloroethylene is rinsed off the cake with a small amount of cyclohexane. The dry cake weighs 55 g., corresponding to 93 percent recovery.

|  | 1,12-dodecanedioic acid | n—$C_8$—$C_{17}$ Monobasic Acids |
|---|---|---|
| Feed | 97.8% | 0.05% |
| Product | 99.6% | 0.001% |

EXAMPLE III (9154-189)

A mixture of 100 g. of 1,12-dodecanedioic acid and 400 cc. of chloroform are heated under reflux for 3 hours, during which time the bulk of the acid remains undissolved. The slurry is cooled to room temperature and filtered, giving essentially 10 percent recovery of dry cake.

|  | 1,12-dodecanedioic acid | n—$C_8$—$C_{17}$ Monobasic Acids |
|---|---|---|
| Feed | 99.72% | 0.12% |
| Product | 99.92% | 0.053% |

EXAMPLE IV (9154-150)

In a manner similar to that in example I, 100 g. of crude 1,12-dodecanedioic acid (23 percent $H_2O$) and 500 cc. of perchloroethylene are heated at 108° C. after removal of a small amount of water by distillation. The cake resulting from filtration at about 10° C. weighs 62 g., corresponding to a recovery of 81 percent. This material is then recrystallized from 400 cc. of 75 parts acetone-25 parts water containing 4 g. of decolorizing charcoal, following filtration to remove the charcoal. The results are shown below. The results obtained upon carbon treatment and crystallization from acetone-water, eliminating the perchloroethylene treatment, are shown for comparison. It is seen that the achievement of the very low monobasic acids level is due to the perchloroethylene treatment.

|  | n—$C_8$—$C_{17}$ Monobasic Acids |
|---|---|
| Feed | 0.3% |
| Perchloroethylene + Acetone/$H_2O$/carbon | 0.004% |
| Acetone/$H_2O$/carbon | 0.16–0.20% |

I claim:

1. A process of removing monobasic carboxylic acids from 1,12-dodecanedioic acid which comprises contacting 1,12-dodecanedioic acid containing the monobasic carboxylic acids with perchloroethylene at a temperature from about 95° to 130° C. to effect solution of monobasic carboxylic acids ad the 1,12-dodecanedioic acid, lowering the temperature of the solution to effect crystallization of the 1,12-dodecanedioic acid and separating the crystallized 1,12-dodecanedioic acid from the solution containing the monobasic carboxylic acids.

2. The process of claim 1 wherein the weight ratio of perchloroethylene to 1,12-dodecanedioic acid is from 1:1 to 50:1.

3. The process of claim 2 wherein the pressure used during the perchloroethylene treatment step is substantially atmospheric.

* * * * *